United States Patent [19]

Mixon, Jr.

[11] 4,127,354
[45] Nov. 28, 1978

[54] REBAR SECURING DEVICE

[75] Inventor: James L. Mixon, Jr., Harrisburg, Pa.

[73] Assignee: AMP Incorporated, Harrisburg, Pa.

[21] Appl. No.: 841,278

[22] Filed: Oct. 12, 1977

[51] Int. Cl.² .............................................. F16B 2/14
[52] U.S. Cl. .................................... 403/279; 403/306; 403/355
[58] Field of Search .............. 403/281, 319, 355, 314, 403/305, 306, 379, 279, 280; 151/26; 85/49

[56] References Cited

U.S. PATENT DOCUMENTS

| 833,349 | 10/1906 | Starkey et al. | 403/305 |
| 840,249 | 1/1907 | Patton | 151/26 |
| 1,180,672 | 4/1916 | Sedinger | 151/26 |
| 2,970,184 | 1/1961 | Blonder | 174/88 |
| 3,217,582 | 11/1965 | Munse | 151/26 X |
| 3,253,332 | 5/1966 | Howlett et al. | 403/314 X |

Primary Examiner—Andrew V. Kundrat
Attorney, Agent, or Firm—Allan B. Osborne

[57] ABSTRACT

The present invention relates to a device for securing (joining or splicing) steel reinforcing bars; i.e., "rebars", together, end-to-end or to provide a deadend connection to one end of a rebar. More particularly, the invention includes a rebar connection body having rebar-receiving openings at either end and two rows of spaced-apart parallel openings along the length of the body. The invention further includes U-shaped staples which are inserted in the parallel holes and forcefully driven onto the rebars, broaching such to create a secure mechanical connection between the body and rebars.

6 Claims, 10 Drawing Figures

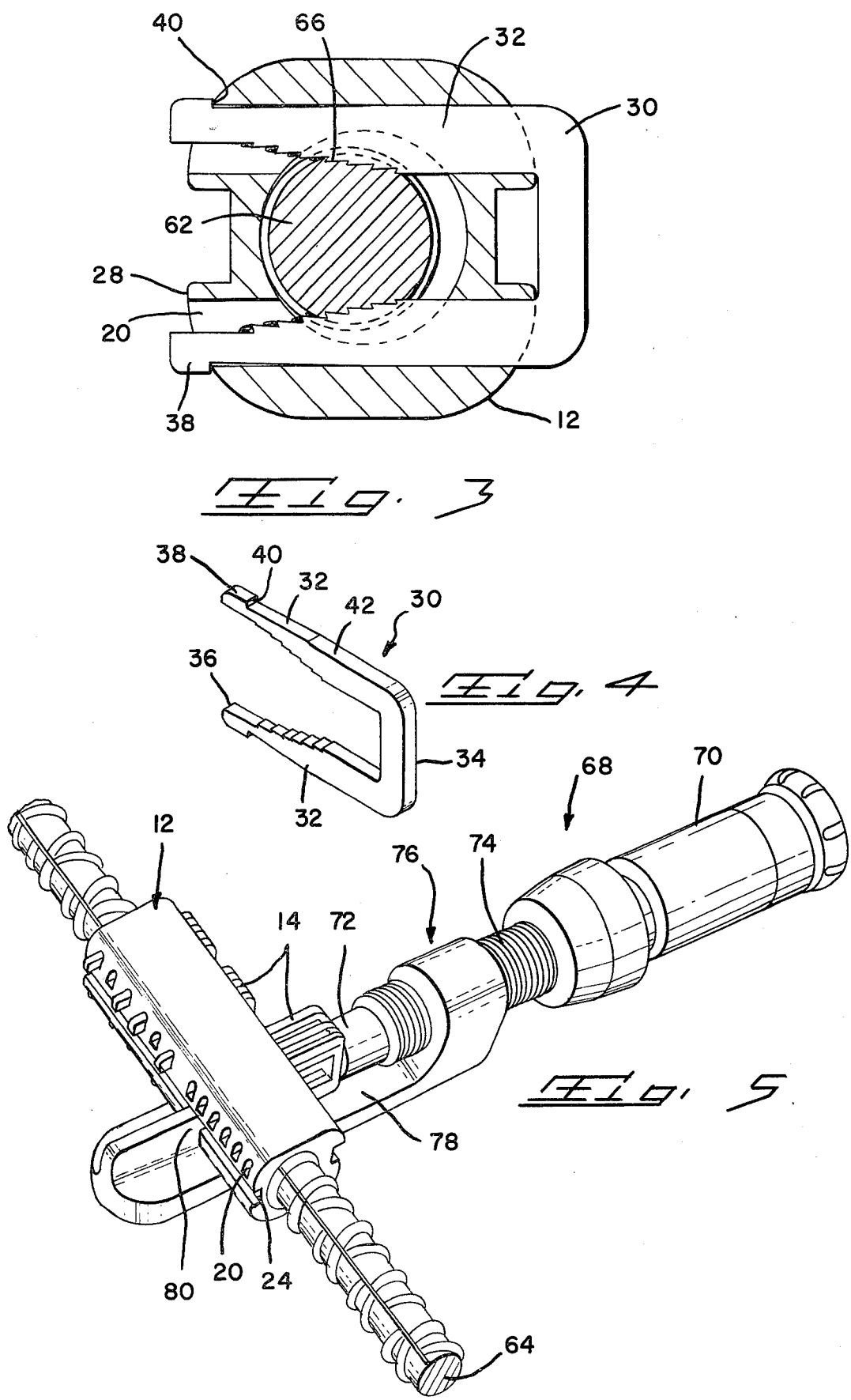

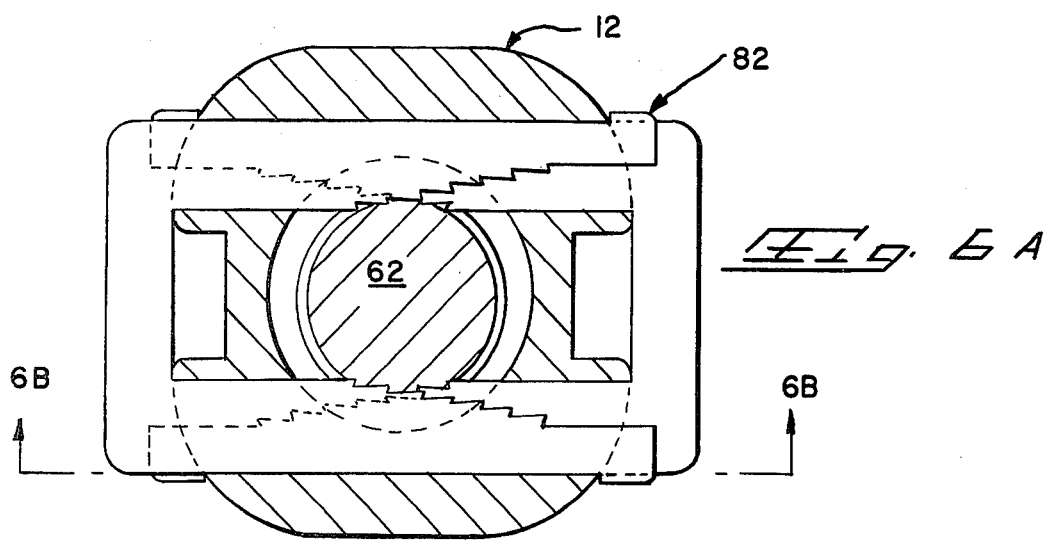
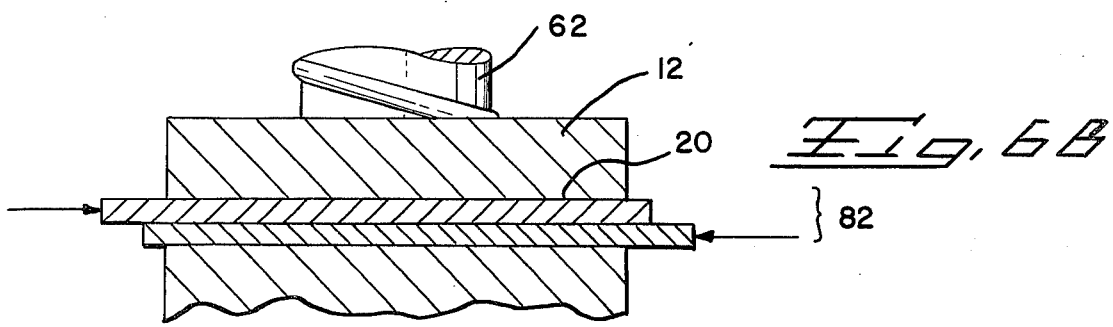
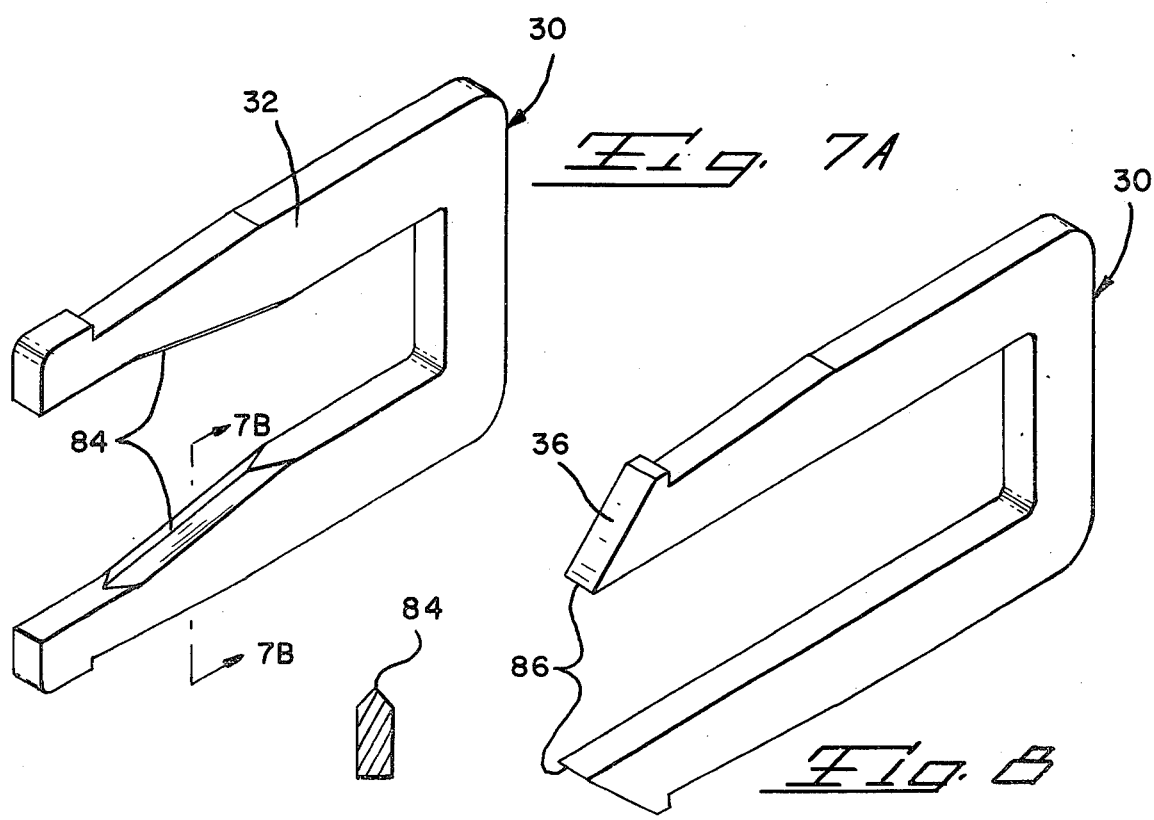

REBAR SECURING DEVICE

BACKGROUND OF THE INVENTION

1. Field of the Invention

This invention is related to devices and methods of connecting lengths of rebars together in providing reinforcement to concrete structures including walls and floors.

2. Prior Art

The primary method in use to connect rebars, end-to-end, is by conventional gas or arc welding. Another method in use is by welding using a mixture of iron oxide and finely divided aluminum, sold by The Metal And Thermit Corporation of Rahway, New Jersey, under the trademark THERMIT. This mixture develops temperatures from about 1100° to about 2760° Centigrade.

SUMMARY OF THE INVENTION

The rebar splicing device consists of a body and staples. The body is elongated with a passageway therethrough to accept the ends of two rebars to be connected or spliced together. Two parallel rows of spaced apart holes extend from one side of the body to the other with the rows intersecting the sides of the passageway. The staples are U-shaped with the inside surface of the legs being stepped to provide a series of teeth. With the rebar ends positioned in the passageway, the staples are placed in the holes and driven against the rebars. The teeth on the legs broach opposite sides of the rebars, creating a locking groove thereon which results in a mechanical connection between the rebars and body.

BRIEF DESCRIPTION OF THE DRAWINGS

FIG. 3 is a cross-sectional view of the embodiment of FIG. 1 subsequent to securing a rebar;

FIG. 4 illustrates an alternate embodiment of one element of the preferred embodiment;

FIG. 5 is a perspective view illustrating one means for securing a rebar in the preferred embodiment of FIG. 1;

FIGS. 6A and 6B illustrate an alternative embodiment;

FIGS. 7A and 7B illustrate an alternative embodiment of one structural feature on one element; and FIG. 8 illustrates another embodiment of one element of the preferred embodiment.

DESCRIPTION OF THE INVENTION

Figure 1:
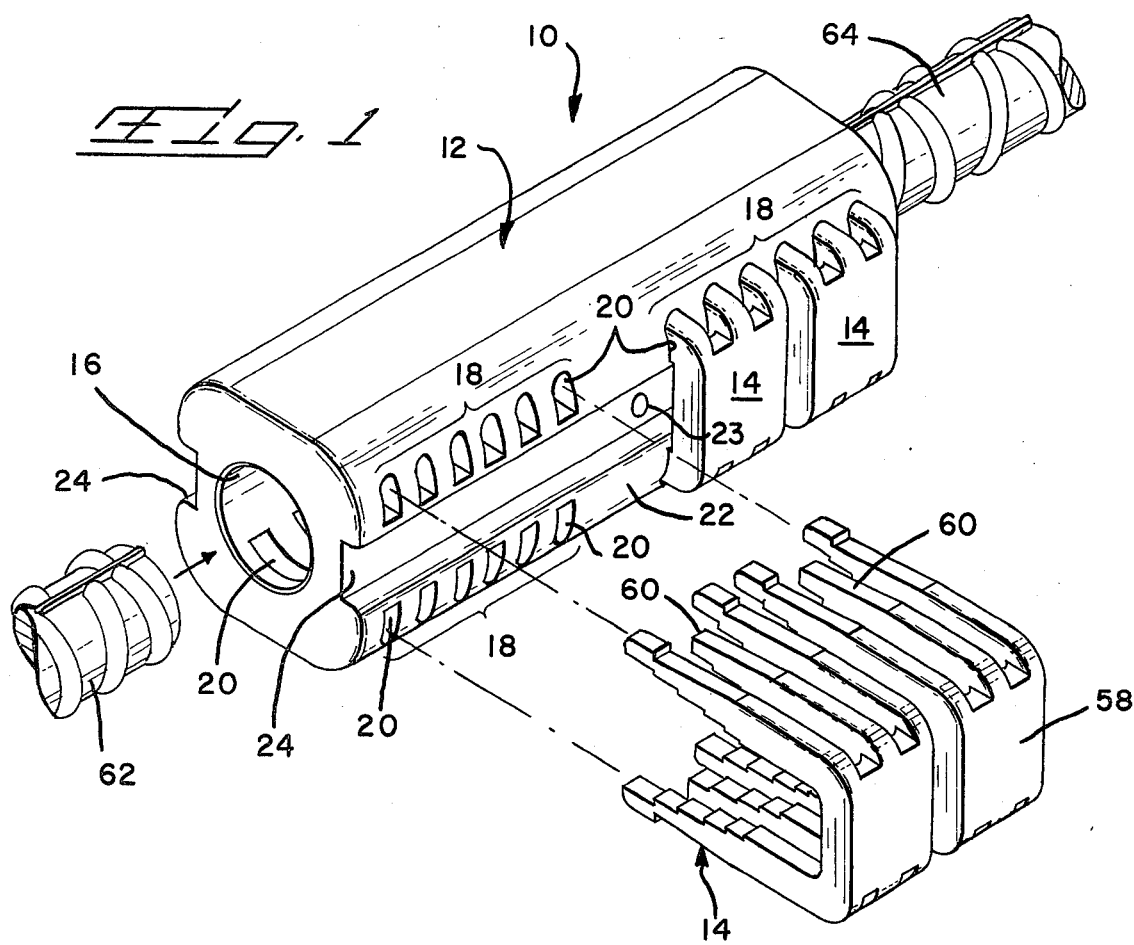
FIG. 1 is a perspective view of the preferred embodiment constructed in accordance with the present invention.

FIG. 1 illustrates the preferred embodiment of the present invention. The rebar securing device 10 comprises a connecting body 12 and one or more staple groups 14.

Body 12 has a generally tubular shape with its precise outward configuration being more important with respect to the method used in driving staple groups 14 thereinto. In other words, the basic inventive concept herein disclosed is not dependent on the precise external shape shown.

A longitudinal passageway 16 extends through body 12 opening out at either end.

Figure 2:
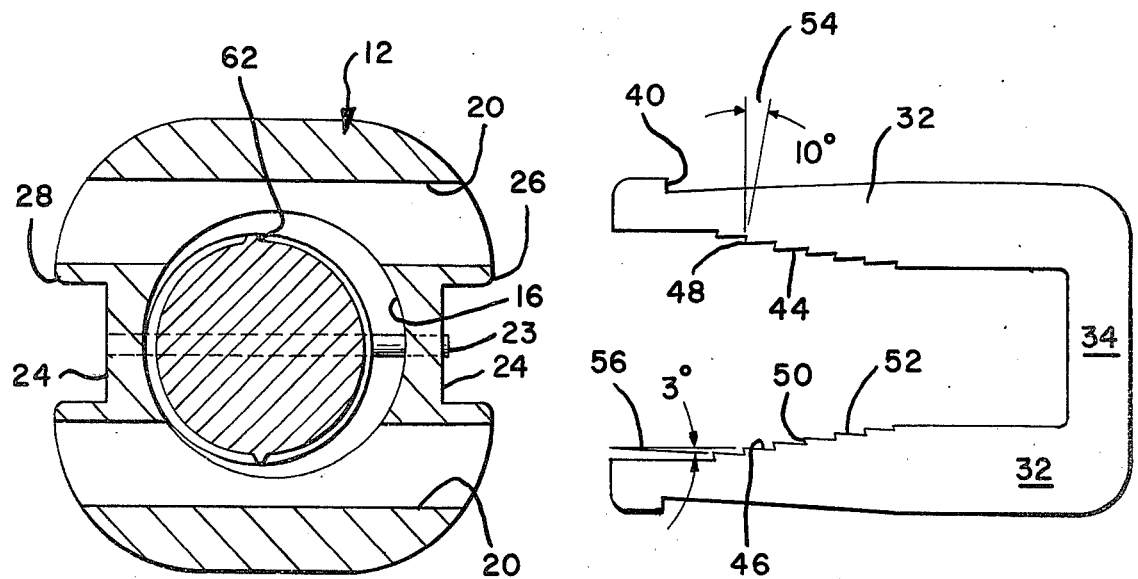
FIG. 2 is a cross-sectional view of the embodiment of FIG. 1 preparatory to securing a rebar.

Two rows 18 of holes 20 extend normally through the body, opening out on opposite sides as seen in FIG. 2. The holes in each row are spaced apart precisely as are the rows themselves with respect to each other. Each hole, as it passes through the body intersects the passageway tangentially. The distance inwardly that the holes penetrate the passageways is a function of the staples and rebar dimensions.

The rows 18 may be continuous along the length of body 12 or separated by a space, indicated generally by reference numeral 22. As will be seen further on, the presence of space 22 is preferable for securing two rebars, end-to-end.

As can be seen in FIG. 2, the configuration or shape of holes 20 is uniform through the body and at either end.

Stop means in the form of a pin 23 extends through body 12 and passageway 16.

In the embodiment illustrated, a slot 24 extends along both opposing sides 26 and 28 of body 12. This slot is used in conjunction with one means for driving staples 14.

Body 12 is preferably made from 4340 heat treated steel. Other suitable materials may also be used however.

Staple group 14, as illustrated in FIG. 1 is, under most circumstances, the preferred stable embodiment. The basic staple is shown in perspective in FIG. 4, being indicated by reference numeral 30. Staple 30 is U-shaped with the two legs 32 being integral with bight 34. The free ends 36 of the legs have a laterally projecting portion 38 which provides a rearwardly facing shoulder 40 on the outer surface 42.

The structural detail of the inner surface 44 of each leg can be seen more clearly in FIG. 2, the staple shown therein being either an end member of staple group 14 or a individual staple 30. The structure consists of a series of teeth 46 or in actuality, forwardly facing shoulders created by the uniform change in the legs width. However, since the function is one of cutting or broaching, the term "teeth" seems appropriate. Each tooth preferably consists of a sharp edge 48 extending across its width, a forwardly facing step 50 and an inwardly facing riser 52. Step 50 is cut so that it angles in towards the bight 34 of staple 30. The preferred angle is ten degrees relative to a line perpendicular to the longitudinal axis of the staple. This angle is indicated generally by reference numeral 54. Each riser 52 is also cut so that they are at a three degree angle relative to the longitudinal axis. Reference numeral 56 points out this angle. The angled steps and risers provide improved cutting efficiency of the teeth. However, the steps and risers could be straight; i.e., not angled, without departing from the inventive concept herein.

Staples 30 are preferably made from cold rolled steel and case hardened. Suitable alloys of similar characteristics may also be used.

Staple group 14 is for the most part a number of staples 30 integrally joined by a strap in the bight area in a side-by-side arrangement as indicated by reference numeral 58. In the embodiment shown in FIG. 1, three staples form a group. The groups shown have one modification in that the center staple, noted by reference numeral 60, does not have portion 38 with its shoulder 40. As a consequence its length is shortened by that feature's absence. The purpose for this modification is for clearance of the driving device disclosed below.

Two typical steel rebars 62 and 64 are shown in FIG. 1. Rebar 64 has been secured in connector body 12 by two staple groups 14. The securing of rebar 62 is illustrated in FIGS. 2 and 3. The rebar is inserted into passageway 16 and the legs of staple 30 or staple group 14 is pushed into holes 20. Thereafter the staples are forcefully driven home, the teeth 46 on each staple by broaching or cutting a slot or groove 66 in the rebar. Obviously the walls of holes 20 confine legs 32. But once the laterally projecting portions 38 clear the other side; i.e., opposing side 28, the forces pushing out on the legs push the shoulders 40 beyond the edge of the holes so as to lock the staple to body 12.

FIG. 5 illustrates one device for driving a group of staples into connector body 12. The device, indicated generally by reference numeral 68, is a modification of a cartridge powered tool marketed under the trademark "AMPACT" by AMP Incorporated of Harrisburg, Pennsylvania. A shotgun-like cartridge (not shown) located within handle 70 drives ram 72 forwardly upon being detonated. The ram in turn drives a staple group 14 (or a single staple 30 as the case might be) into body 12, securing the rebar in the manner discussed above.

A threaded shaft 74 extending forwardly from and connected to handle 70 is threadably connected to a head 76. The ram moves reciprocally within the shaft. Head 76 includes a platform 78 and rearwardly facing nose 80.

A rebar 64 is secured in the following manner using the above described driving means. First the rebar is inserted into passageway 16 until it hits pin 23. Staples 30 or groups 14 are inserted in the holes and tapped into limited engagement with the rebar. Device 68 is installed on body 12 as shown in FIG. 5 with ram 72 advanced by hand to abutting engagement with bight 34 or strap 58. Upon detonating the cartridge, the ram drives the staple(s) into a securing position around the rebar.

FIGS. 1 and 5 show staple groups 14 being driven into body 12 from one side. Another method which may be used is to drive one group or one staple in from one side and the next group or staple in from the other side.

The dimensions of body 12 and staples 30 may be varied depending upon the size of rebar to be secured. As way of example only, one such device, useful for securing #6 rebars of 19.05 mm (0.75 inches) in diameter has the following dimensions:

| Body 12 | mm | inches |
| --- | --- | --- |
| length l = | 106.68 | 4.20 |
| width w = | 34.80 | 1.37 |
| height h = | 34.80 | 1.37 |
| passage ID = | 20.57 | 0.81 |
| hole ID = | 3.96 | 0.156 |
| Staple 30 | mm | inches |
| length l = | 44.45 | 1.75 |
| width w = | 27.68 | 1.09 |
| thickness t = | 3.63 | 0.143 |
| widest span between legs = | 19.05 | 0.750 |
| narrowest span between legs = | 13.49 | 0.531 |
| no. of teeth | 6 | |
| length between end of legs to last teeth = | 24.13 | 0.95 |

The above described embodiment may be modified in a number of ways. For example, FIGS. 6A and 6B illustrate a rebar being secured by sets 82 of staples 30. Each set consists of two staples, one being driven in from one side and the other being driven in from the opposite side with both staples, occupying the same home 20 as shown in FIG. 6B.

The cutting means on the staples may be modified or changed also. FIG. 7A illustrates a staple 30 having a sharp ridge 84 on the inside surfaces of legs 32 in lieu of teeth 46. FIG. 7B shows the ridge in cross section.

Yet another embodiment with respect to staple 30 is shown in FIG. 8. In this embodiment, the free ends 36 are beveled inwardly to provide a chisel point 86. In this embodiment the space between the two legs 32 is constant.

Holes 20 in body 12 may be modified by tapering them (not shown) whereby the legs 32 are compressed inwardly as the staples are being driven into the body.

The foregoing detailed description has been given for clearness of understanding only, and no unnecessary limitations should be understood therefrom, as some modifications will be obvious to those skilled in the art.

I claim:

1. A device for securing reinforcing bars and the like, comprising:
   a. an elongated body having an axial opening therein and two spaced apart rows of holes along a portion of the length of and extending normally through the body, said holes intersecting the opening on opposing sides; and
   b. one or more staples, each having a pair of legs extending from either side of a bight with the legs having a plurality of cutting teeth on the inside surface thereof, each having an edge formed between step and riser portions which extend along the axis of the staple, said legs being adapted to be driven into the holes whereby said cutting teeth may broach a reinforcing bar or the like which may be positioned in said opening thereby securing it against axial movement.

2. The device of claim 1 wherein said teeth have a sharp edge with a forwardly facing step and an inwardly facing riser, said steps and risers being beveled.

3. The device of claim 2 wherein the angle between said beveled steps and a line normal to the axis of the staple is about ten degrees.

4. The device of claim 2 wherein the angle between said beveled risers and the axis of the staple is about three degrees.

5. The device of claim 1 wherein said staples are formed in integral groups of two or more.

6. The device of claim 1 wherein two staples are driven into the same hole in the body but from alternative sides.

* * * * *